(No Model.)

J. W. DILLER.
ROAD CART.

No. 265,768. Patented Oct. 10, 1882.

Witnesses
A. L. Hill
W. Ermentraut

Inventor
Jacob W. Diller
By L. P. Graham atty

UNITED STATES PATENT OFFICE.

JACOB W. DILLER, OF DECATUR, ILLINOIS.

ROAD-CART.

SPECIFICATION forming part of Letters Patent No. 265,768, dated October 10, 1882.

Application filed July 3, 1882. (No model.)

*To all whom it may concern:*

Be it known that I, JACOB W. DILLER, a resident of the city of Decatur, county of Macon, and State of Illinois, have invented certain new and useful Improvements in Road-Carts, of which the following is a specification.

In my device the axle is arched. The springs extend from side to side beneath the axle. A pair of iron bars, hinged to a cross-bar of the shafts, extend down and back, supporting a foot-rest. The same bars extend up and back over the springs and form a support for the seat. A pair of swinging braces connect the seat with the rear of the shafts. The springs used are the Timkin or Woodhull, which are swung one on each side of the axle.

Figure 1:
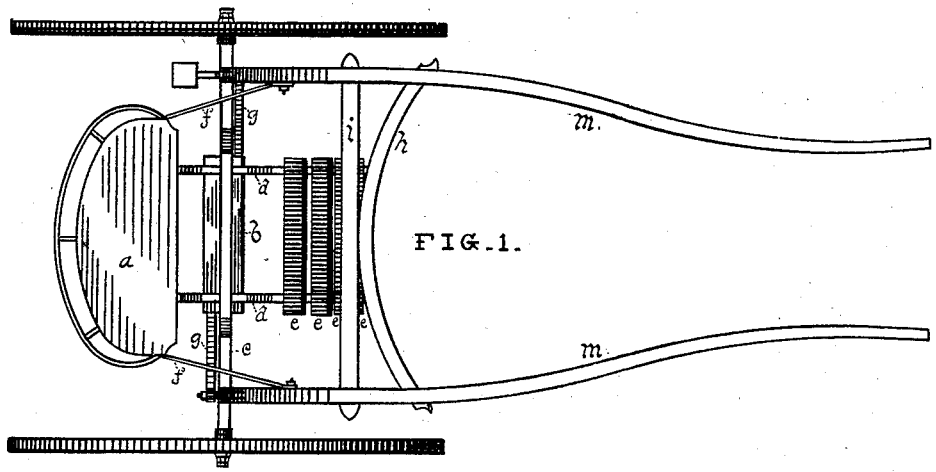
Figure 2:
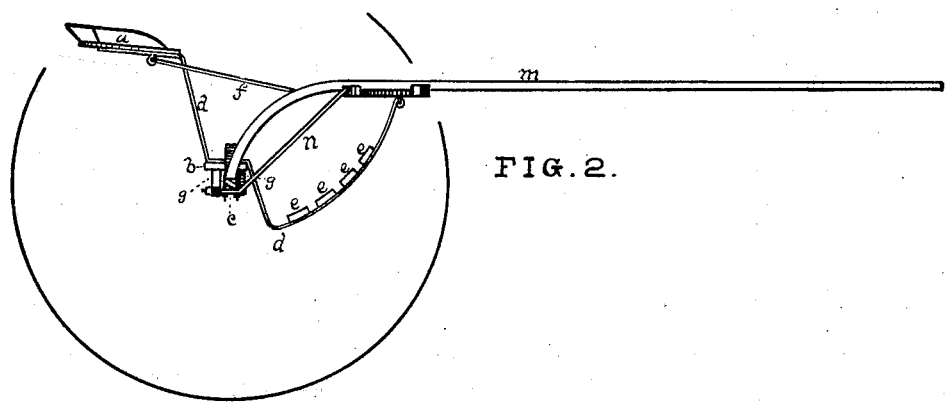
Figure 3:
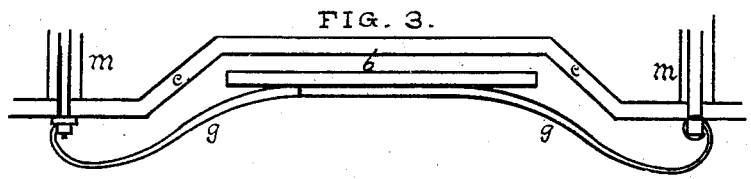

In the drawings accompanying and forming a part of this specification, Figure 1 is a plan of my device. Fig. 2 is a side elevation of the same. Fig. 3 is a rear view of the springs and axle.

$a$ is the seat. $b$ is a platform or strip to which the springs and seat-bars are attached. $c$ is the axle. $d\ d$ are the bars that support the seat and foot-rest. $e\ e\ e\ e$ represent the foot-rest. $f f$ are swinging braces that connect the seat with the shafts. $g\ g$ are the springs. $h\ i$ are cross-bars of the shafts. $n\ n$ are braces that strengthen the shafts and furnish supports for the springs.

I claim—

1. Arched axle $c$, strip $d$, and springs $g\ g$, as and for the purpose set forth.

2. The combination, with shafts $m\ m$ and axle $c$, of braces $n\ n$, that form supports for the springs, substantially as shown and described.

3. The swinging frame $a\ b\ d\ e\ f$, hinged to the shafts $m\ m$ and supported by springs $g\ g$, substantially as shown and described.

JACOB W. DILLER.

Attest:
ABRAM KRAMER,
L. P. GRAHAM.